United States Patent
Narahara et al.

(10) Patent No.: US 11,608,017 B2
(45) Date of Patent: Mar. 21, 2023

(54) VEHICLE FRONT BODY STRUCTURE

(71) Applicant: MAZDA MOTOR CORPORATION, Hiroshima (JP)

(72) Inventors: Takashi Narahara, Aki-gun (JP); Nobuyuki Shibutake, Aki-gun (JP); Yasushi Ishikawa, Aki-gun (JP); Yuichi Morita, Aki-gun (JP); Ken Fujimoto, Aki-gun (JP); Yusaku Yamaguchi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 65 days.

(21) Appl. No.: 17/356,351

(22) Filed: Jun. 23, 2021

(65) Prior Publication Data

US 2022/0001819 A1 Jan. 6, 2022

(30) Foreign Application Priority Data

Jul. 1, 2020 (JP) .............................. JP2020-113722

(51) Int. Cl.
*B60J 7/00* (2006.01)
*B60R 19/34* (2006.01)
*B60R 19/18* (2006.01)
*B62D 21/15* (2006.01)

(52) U.S. Cl.
CPC .............. *B60R 19/34* (2013.01); *B60R 19/18* (2013.01); *B62D 21/152* (2013.01)

(58) Field of Classification Search
CPC ........ B60R 19/34; B60R 19/18; B62D 21/152
See application file for complete search history.

(56) References Cited

U.S. PATENT DOCUMENTS

| 4,563,028 | A  | * | 1/1986 | Ogawa ................... B60R 19/18 293/122 |
| 5,957,512 | A  | * | 9/1999 | Inada ...................... B60R 19/24 293/121 |
| 6,231,094 | B1 | * | 5/2001 | Uytterhaeghe ......... B60R 19/36 293/122 |
| 6,712,411 | B2 | * | 3/2004 | Gotanda ................. B60R 19/24 296/203.02 |
| 6,726,261 | B2 | * | 4/2004 | Goto ....................... B60R 19/04 293/120 |

(Continued)

FOREIGN PATENT DOCUMENTS

JP 2019-130972 A 8/2019

*Primary Examiner* — Kiran B Patel
(74) *Attorney, Agent, or Firm* — Studebaker & Brackett PC

(57) ABSTRACT

A vehicle front body structure is provided for reliably transferring a collision load to a crash can and a front frame by preventing a bumper beam from buckling during a small overlap collision. Bending rigidity of the bumper beam in a vehicle width direction is such that 1) a bending moment generated on the bumper beam when a collision load in a direction toward a vehicle rear side is applied to an extending section, which extends outward in the vehicle width direction from a crash can fixed section, is the highest in a vehicle width direction inner end portion of the crash can fixed section on a side where the collision load is applied, and 2) the bending moment is continuously reduced as a distance from the vehicle width direction inner end portion in the vehicle width direction increases.

7 Claims, 13 Drawing Sheets

(56) References Cited

U.S. PATENT DOCUMENTS

| | | | | |
|---|---|---|---|---|
| 7,290,811 B1* | 11/2007 | Arns | ............... | B60R 19/24 |
| | | | | 293/133 |
| 7,896,411 B2* | 3/2011 | Kano | ............... | F16F 7/12 |
| | | | | 293/133 |
| 7,926,865 B2* | 4/2011 | Terada | ............... | B60R 19/34 |
| | | | | 296/132 |
| 7,931,318 B2* | 4/2011 | Matsumura | ............... | B60R 19/24 |
| | | | | 293/133 |
| 7,980,606 B2* | 7/2011 | Takahashi | ............... | B60R 21/0136 |
| | | | | 293/117 |
| 8,210,601 B2* | 7/2012 | Terada | ............... | B60R 19/34 |
| | | | | 293/133 |
| 8,231,155 B2* | 7/2012 | Arns | ............... | B60R 19/34 |
| | | | | 293/102 |
| 8,430,437 B2* | 4/2013 | Asakawa | ............... | B60R 19/34 |
| | | | | 293/133 |
| 8,985,651 B2* | 3/2015 | Honda | ............... | B60R 19/34 |
| | | | | 293/120 |
| 9,168,883 B1* | 10/2015 | Midoun | ............... | B62D 25/082 |
| 9,254,801 B2* | 2/2016 | Sogabe | ............... | B60R 19/12 |
| 9,327,675 B2* | 5/2016 | Kito | ............... | B60R 19/12 |
| 9,630,578 B1* | 4/2017 | Nusier | ............... | B60R 19/12 |
| 9,821,741 B2* | 11/2017 | Kashiwagi | ............... | B62D 25/082 |
| 2012/0104777 A1* | 5/2012 | Ghannam | ............... | B60R 19/34 |
| | | | | 293/133 |
| 2014/0117685 A1* | 5/2014 | Honda | ............... | B60R 19/18 |
| | | | | 293/133 |
| 2018/0056906 A1* | 3/2018 | Wu | ............... | B60R 19/18 |
| 2018/0281863 A1* | 10/2018 | Daikoku | ............... | B62D 21/155 |
| 2019/0016389 A1* | 1/2019 | Kamei | ............... | B60R 19/34 |
| 2019/0232904 A1* | 8/2019 | Kurogi | ............... | B60R 19/18 |
| 2021/0053518 A1* | 2/2021 | Karlsson | ............... | B60R 19/34 |

* cited by examiner

VEHICLE FRONT BODY STRUCTURE

TECHNICAL FIELD

The present disclosure relates to a vehicle front body structure.

BACKGROUND

A conventional vehicle front body structure is provided with a crash box (hereinafter referred to as a crash can) on a vehicle rear side in order to absorb a collision load from a vehicle front side, and the crash can is more easily deformed than a bumper.

For example, a front body structure disclosed in Japanese Patent document JP-A-2019-130972 includes a pair of side members each of which extends in a vehicle longitudinal direction (hereinafter referred to as front frames); a pair of crash cans each of which is fixed to a front end of a respective one of the front frames; and a bumper that is fixed to a front end of each of the crash cans and extends in a vehicle width direction. A reinforcing member for reinforcing the bumper is accommodated in each end portion of the hollow bumper.

SUMMARY

In the case of a small overlap collision, that is, in the case where an object (an oncoming vehicle, an on-road installed object, or the like) partially collides with at least one of the end portions of the bumper on an outer side of the front frame in the vehicle width direction from the vehicle front side, it is preferred, from a perspective of securing safety on the inside of a cabin and the like, to transfer a collision load to the crash can and the front frame while maintaining a shape of the bumper to a certain extent without causing buckling of the bumper, so as to absorb energy during the collision by deformation of the crash can and the front frame.

When each fixed portion which is fixed to the crash can in the bumper is considered, a distance from a collision load application point in a vehicle width direction end portion of the bumper to a vehicle width direction inner end portion in the fixed portion of the bumper is longer than that to a vehicle width direction outer end portion thereof. Accordingly, when the collision load in a direction toward a vehicle rear side is partially applied to at least one of the vehicle width direction end portions of the bumper, the vehicle width direction inner end portion in the fixed portion of the bumper is most likely to buckle.

In addition, in the structure accommodating the reinforcing member in each of the end portions of the hollow bumper as described above, when the collision load is applied to at least one of the vehicle width direction end portions of the bumper, the reinforcing member turns in the vehicle longitudinal direction in the bumper due to the application of the collision load to an end portion of the reinforcing member. As a result, the load in a buckling direction is locally applied to the vehicle width direction inner end portion in the fixed portion of the bumper from an inner end portion of the reinforcing member, and thus the vehicle width direction inner end portion in the fixed portion of the above bumper is further likely to buckle.

In the case where the vehicle width direction inner end portion in the fixed portion of the bumper buckles during the small overlap collision, it becomes difficult to transfer the collision load to the crash can and the front frame on a vehicle rear side of the bumper. The present disclosure has been made in view of the above circumstances and therefore has a purpose of providing a vehicle front body structure, the vehicle front body structure capable of reliably transferring a collision load to a crash can and a front frame by preventing a bumper beam from buckling during a small overlap collision.

In order to solve the above problem, a vehicle front body structure according to the present disclosure includes: a pair of front frames that are arranged away from each other in a vehicle width direction and extend in a vehicle longitudinal direction; a pair of crash cans each of which is fixed to a front end of a respective one of the paired front frames and extends in the vehicle longitudinal direction; and a bumper beam that is fixed to the front ends of the paired crash cans and extends in the vehicle width direction. The bumper beam includes, on each side in the vehicle width direction, a crash can fixed section that is fixed to the crash can; and an extending section that extends outward in the vehicle width direction from the crash can fixed section. Bending rigidity in the vehicle width direction of the bumper beam is such that a bending moment generated on the bumper beam when a collision load in a direction toward a vehicle rear side is applied to the extending section is the highest in a vehicle width direction inner end portion of the crash can fixed section on a side where the collision load is applied, and the bending moment is continuously reduced as a distance from the vehicle width direction inner end portion in the vehicle width direction increases.

A distance from a collision load application point is longer to the vehicle width direction inner end portion of the crash can fixed section in the bumper beam than to a vehicle width direction outer end portion. Thus, the vehicle width direction inner end portion of the crash can fixed section in the bumper beam is most likely to buckle when the collision load in the direction toward the vehicle rear side is applied to the extending section (that is, at the time of a small overlap collision). Accordingly, since the bending rigidity in the vehicle width direction of the bumper beam is set as described above, the bending moment generated on the bumper beam is the highest in the vehicle width direction inner end portion of the crash can fixed section on the side where the collision load is applied (that is, the bending rigidity of the bumper beam is the highest), and the bending moment is continuously reduced as the distance from the vehicle width direction inner end portion in the vehicle width direction increases (that is, the bending rigidity of the bumper beam is continuously reduced). In this way, the bumper beam can have a bending moment characteristic capable of reducing stress concentration for an entire width of the bumper beam including the vehicle width direction inner end portion. As a result, it is possible to prevent buckling of the bumper beam.

In the above configuration, during a small overlap collision, a difference in the rigidity between the adjacent positions in the vehicle width direction of the bumper beam is reduced while buckling of the vehicle width direction inner end portion of the crash can fixed section in the bumper beam is prevented. In this way, it is possible to reduce the stress concentration in the bumper beam so as to prevent buckling of the bumper beam, and it is possible to reliably transfer the collision load, which is applied to the bumper beam, to the crash cans and the front frames.

In the above vehicle front body structure, the cross-sectional area of the vehicle width direction inner end portion of the crash can fixed section is preferably the largest cross-sectional area of the bumper beam in the vehicle width direction.

With such a configuration, since the cross-sectional area of the vehicle width direction inner end portion of the crash can fixed section is the largest, it is possible to improve the bending rigidity of the vehicle width direction inner end portion, and it is thus possible to prevent buckling of the bumper beam.

In the above vehicle front body structure, the width in the vehicle longitudinal direction of the vehicle width direction inner end portion of the crash can fixed section is preferably the greatest width in the vehicle longitudinal direction of the bumper beam in the vehicle width direction.

With such a configuration, since the width in the vehicle longitudinal direction of the vehicle width direction inner end portion of the crash can fixed section is the greatest, it is possible to improve the bending rigidity of the vehicle width direction inner end portion, and it is thus possible to prevent buckling of the bumper beam.

In the above vehicle front body structure, the height of the vehicle width direction inner end portion of the crash can fixed section is preferably the greatest height of the bumper beam in the vehicle width direction.

With such a configuration, the height of the vehicle width direction inner end portion of the crash can fixed section is the greatest, it is possible to improve the bending rigidity of the vehicle width direction inner end portion, and it is thus possible to prevent buckling of the bumper beam.

In the above vehicle front body structure, preferably, the bumper beam has a reinforcing member, the reinforcing member extending in the vehicle width direction and having a U-shaped cross section, and an area defined by the U-shaped cross section is the largest at a position of the vehicle width direction inner end portion of the crash can fixed section.

With such a configuration, the bumper beam has the reinforcing member therein, and the area defined by the U-shaped cross section of the reinforcing member is the largest at the position of the vehicle width direction inner end portion of the crash can fixed section. In this way, a reinforcing effect for the vehicle width direction inner end portion of the bumper beam by the reinforcing member becomes the highest. Thus, it is possible to improve the bending rigidity of the vehicle width direction inner end portion the most. As a result, it is possible to further suppress buckling of the bumper beam.

In the above vehicle front body structure, preferably, the bumper beam has an upper surface and a lower surface each of which extends in the vehicle width direction, and at least one of the upper surface and the lower surface is formed with a step section bent in a vertical direction and extending in the vehicle width direction between the vehicle width direction inner end portions on both of the sides in the vehicle width direction.

With such a configuration, at least one of the upper surface and the lower surface of the bumper beam is formed with the step section bent in the vertical direction and extending in the vehicle width direction, between the vehicle width direction inner end portions on both of the sides in the vehicle width direction. By this step section, it is possible to reinforce the bending rigidity of the bumper beam continuously in the vehicle width direction and thus to reduce the difference in the rigidity between the adjacent positions in the vehicle width direction of the bumper beam. As a result, it is possible to further suppress the stress concentration in the bumper beam so as to further suppress buckling of the bumper beam.

According to the vehicle front body structure of the present disclosure, it is possible to reliably transfer the collision load to the crash cans and the front frames by suppressing the bumper beam from buckling during the small overlap collision.

DETAILED DESCRIPTION

Figure 1:
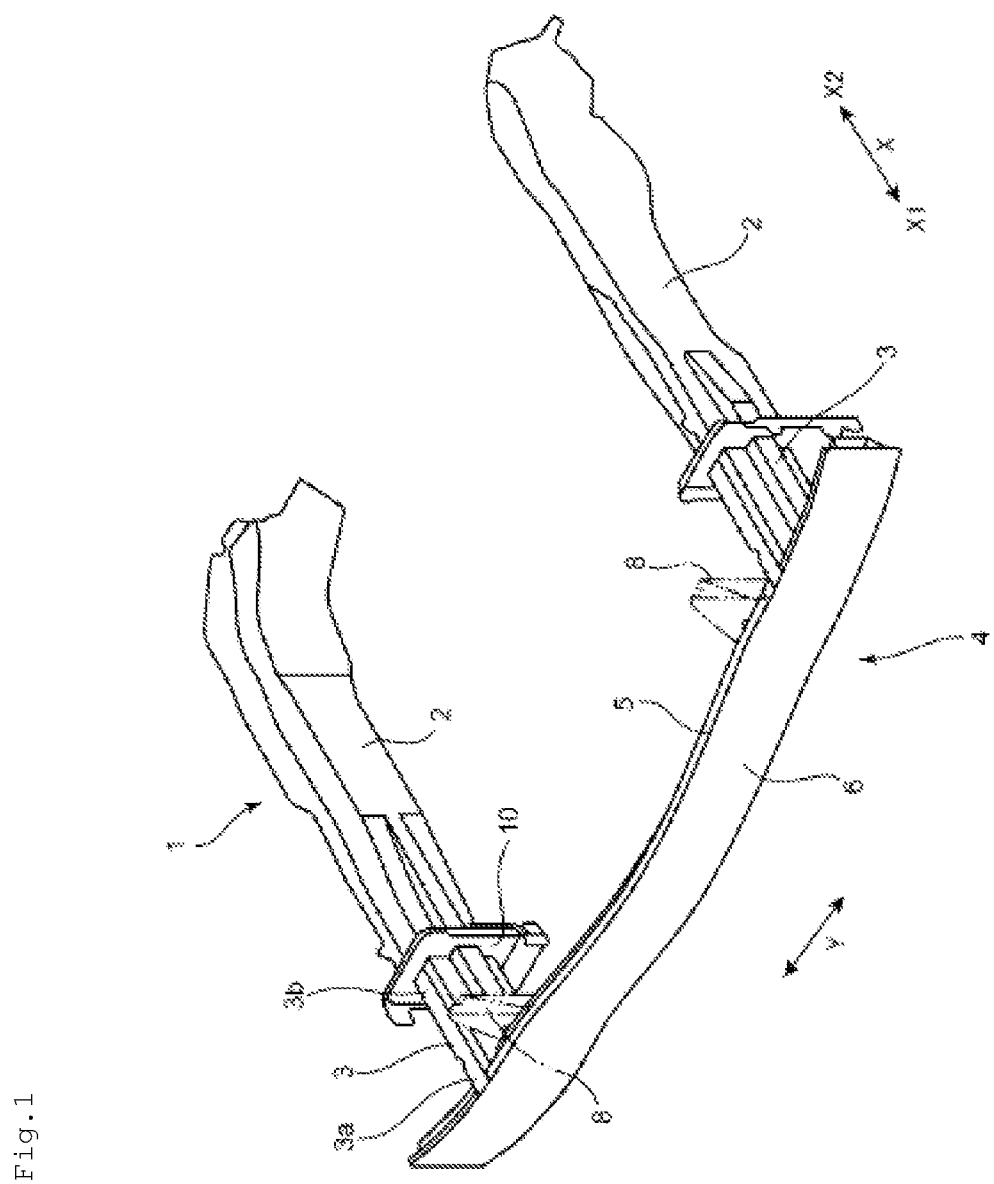
FIG. 1 is a perspective view illustrating an overall configuration of a vehicle front body structure according to an embodiment of the present disclosure, in which the configuration of the front body structure is seen obliquely from the front and seen from above.

A detailed description will hereinafter be made of an embodiment of the present disclosure with reference to the accompanying drawings.

A vehicle front body structure 1 according to this embodiment illustrated in FIGS. 1 to 6 is constructed of a collection of components that are applied with a collision load during a collision with an object (an oncoming vehicle, an on-road installed object, or the like) from a vehicle front side X1. More specifically, the vehicle front body structure 1 includes: a pair of front frames 2, a pair of crash cans 3, and a bumper 4 including a bumper beam 5.

Figure 2:
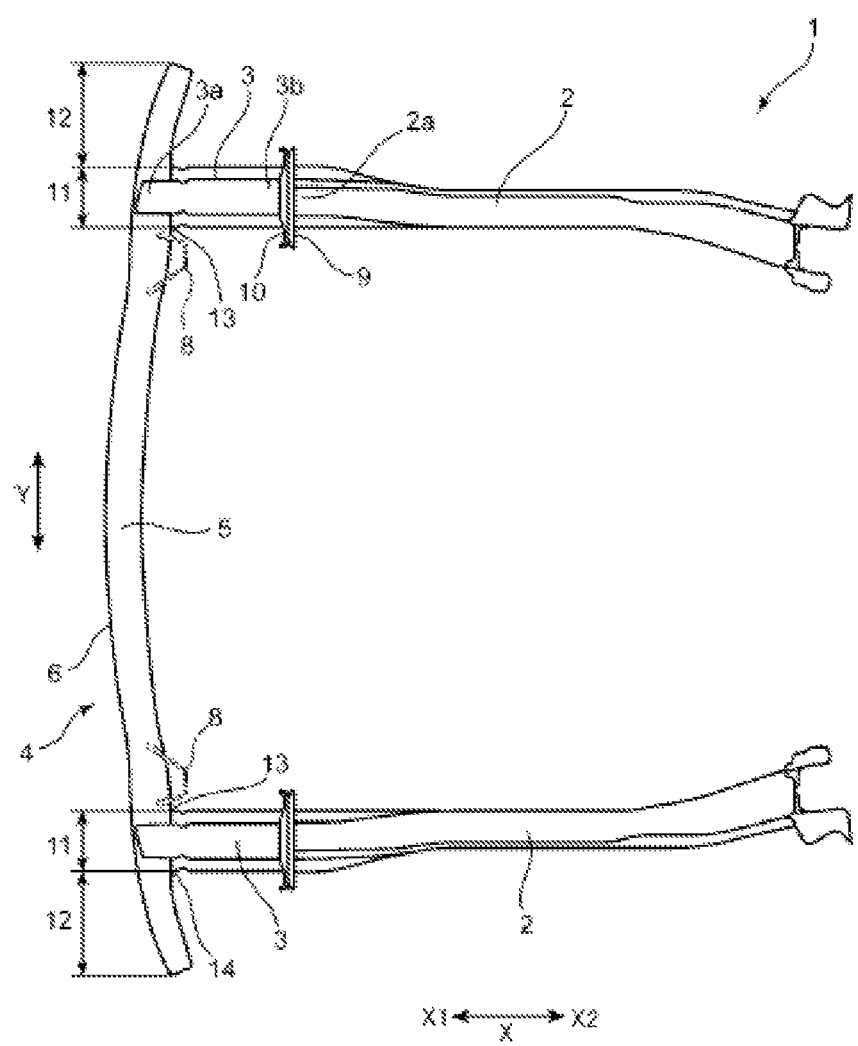
FIG. 2 is a plan view of the front body structure in FIG. 1.
Figure 3:
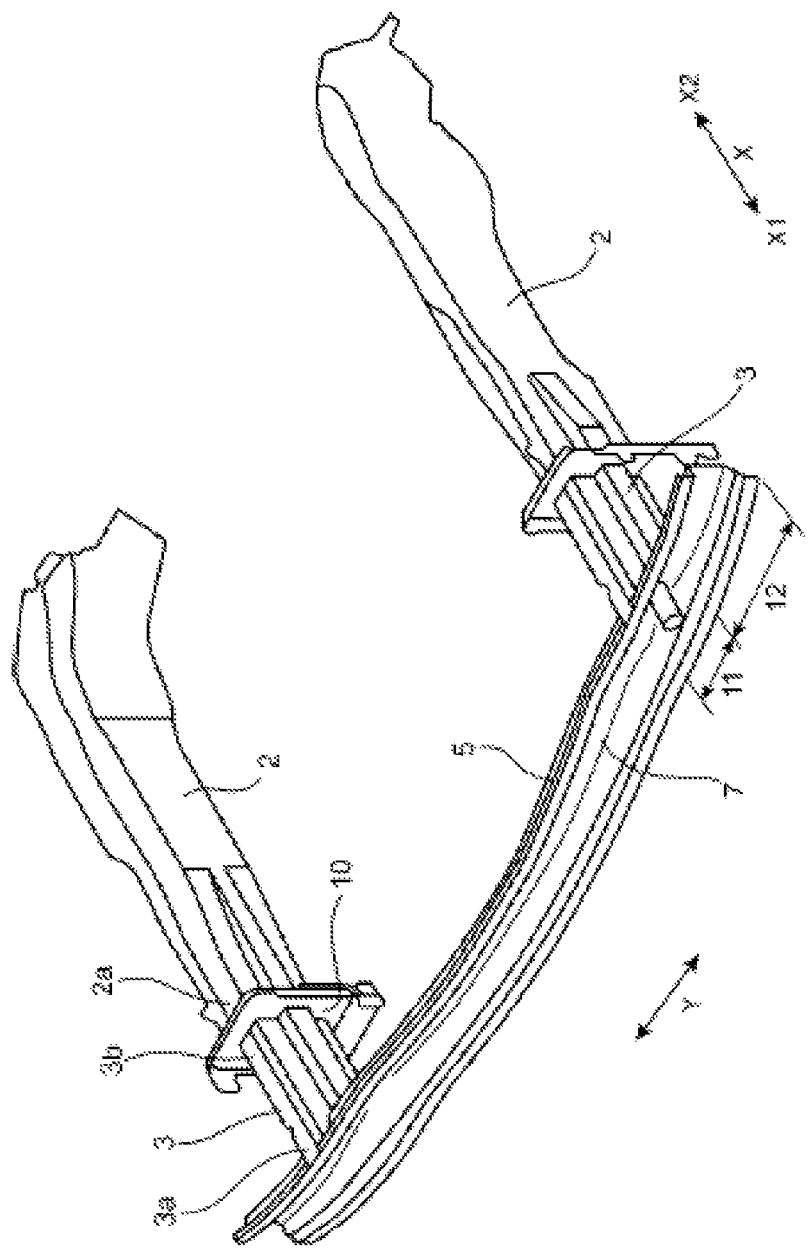
FIG. 3 is a perspective view of the front body structure in FIG. 1 in a state where a front plate of a bumper is removed.
Figure 4:
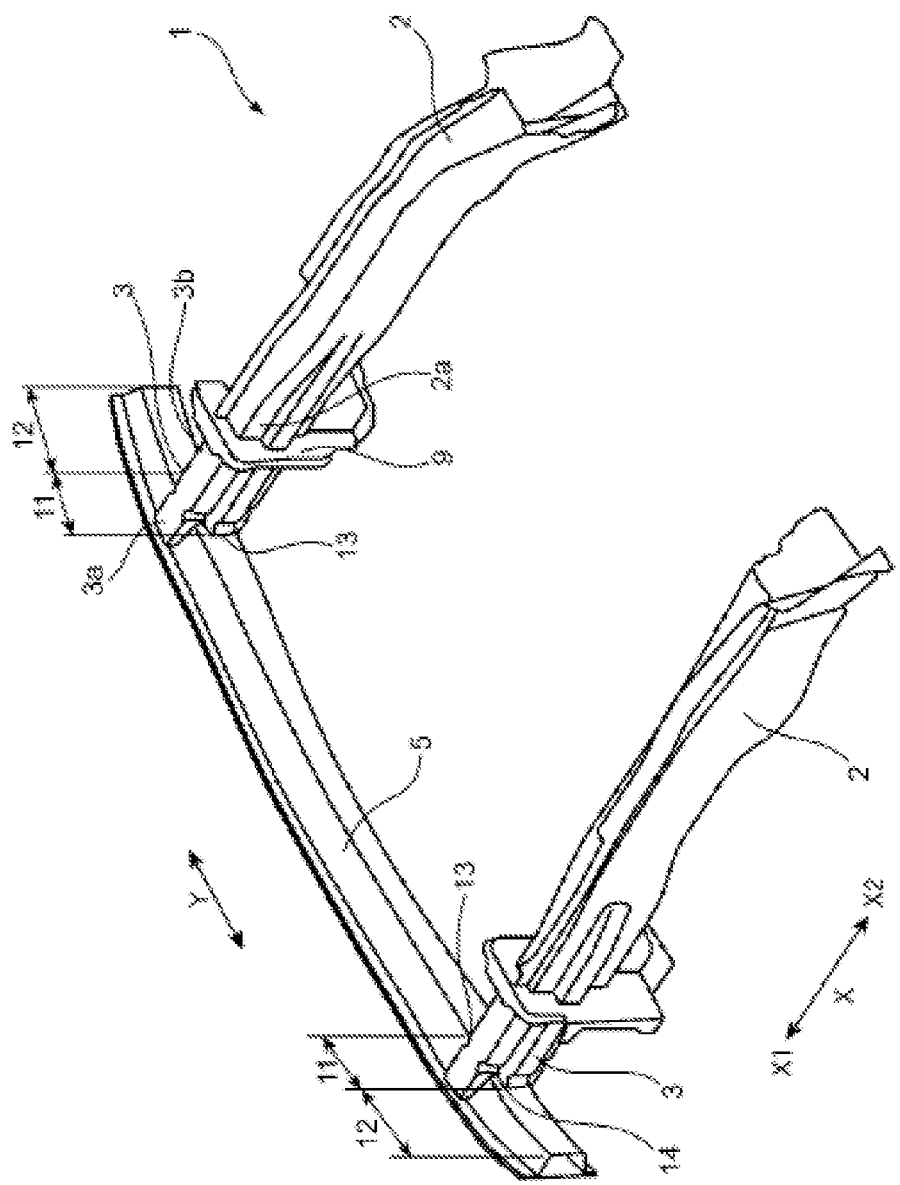
FIG. 4 is a perspective view of the front body structure in FIG. 1 that is seen obliquely from behind and seen from above.
Figure 5:
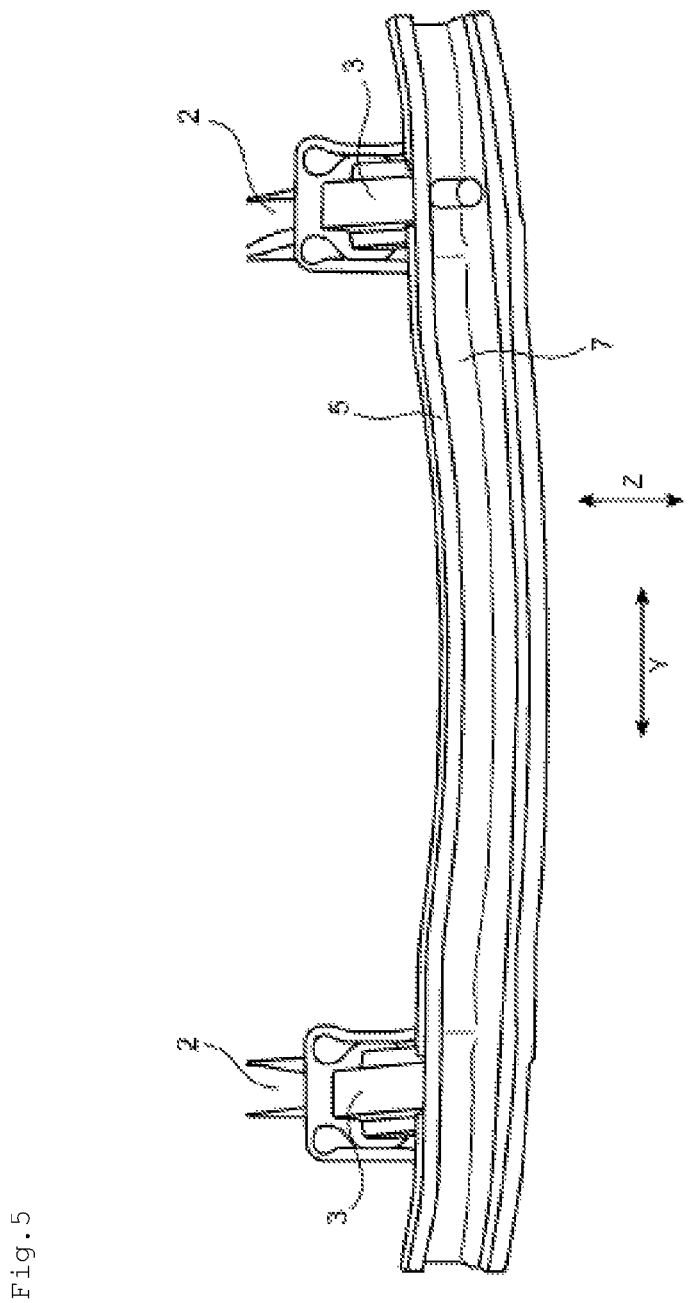
FIG. 5 is an enlarged perspective view of the front body structure in FIG. 1 in which the state where the front plate of the bumper is removed is seen from the front and above.
Figure 6:
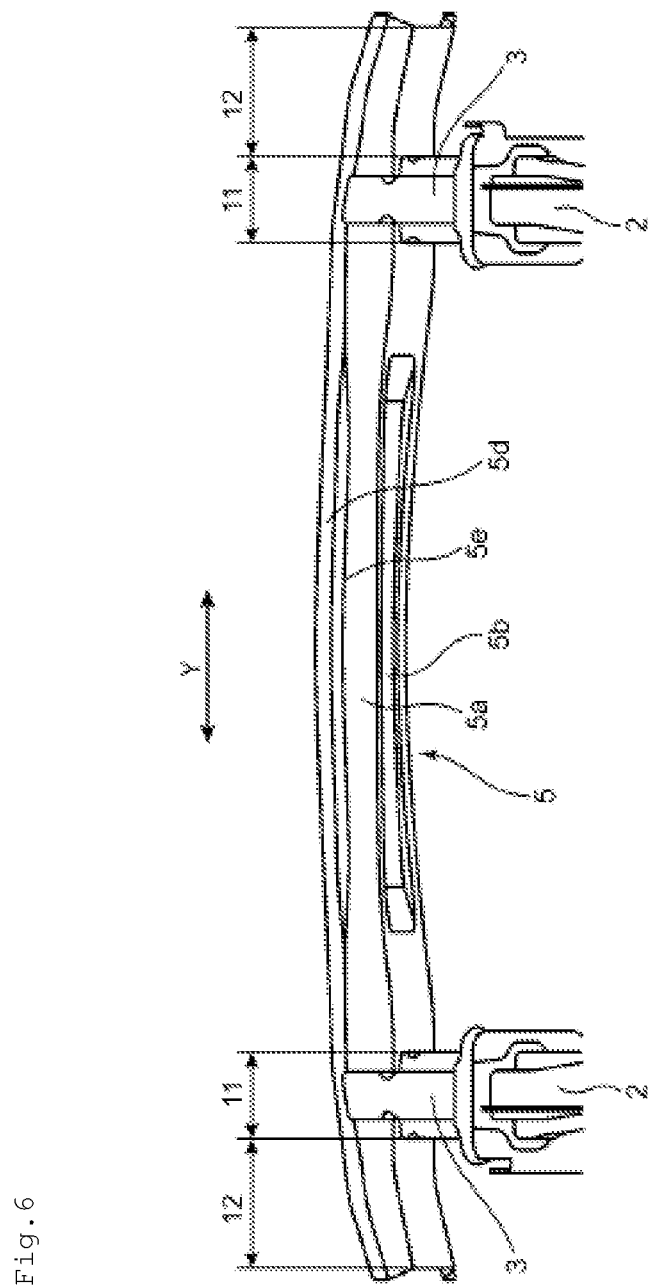
FIG. 6 is an enlarged perspective view of the front body structure in FIG. 1 in which a bumper beam of the bumper and peripheries thereof are seen from behind and above.

FIGS. 1 to 2 each illustrate a bracket 8 to which a shroud of a radiator is attached. This bracket 8 may not be provided since the bracket 8 is a component that does not contribute to application of the collision load.

The paired front frames 2 are arranged away from each other in a vehicle width direction Y and extend in a vehicle longitudinal direction X. An attachment flange 9 for fixing the crash can 3 is provided at a front end 2a of each of the front frames 2. Meanwhile, a rear end of the front frame 2 is fixed to a vehicle body component such as a hinge pillar, which is not illustrated.

Each of the paired crash cans 3 is fixed to the front end 2a of respective one of the paired front frames 2, and extends in the vehicle longitudinal direction X.

A front end 3a of the crash can 3 in this embodiment is fixed to the bumper beam 5 by welding or the like, and an attachment flange 10 is provided at a rear end 3b thereof. The attachment flange 10 at the rear end 3b of the crash can 3 is superposed on the attachment flange 9 at the front end 2a of the front frame 2, and the attachment flanges 9, 10 are coupled to each other by using a fastener such as a bolt. In this way, the crash can 3 is fixed to the front end 2a of the front frame 2.

Figure 13:
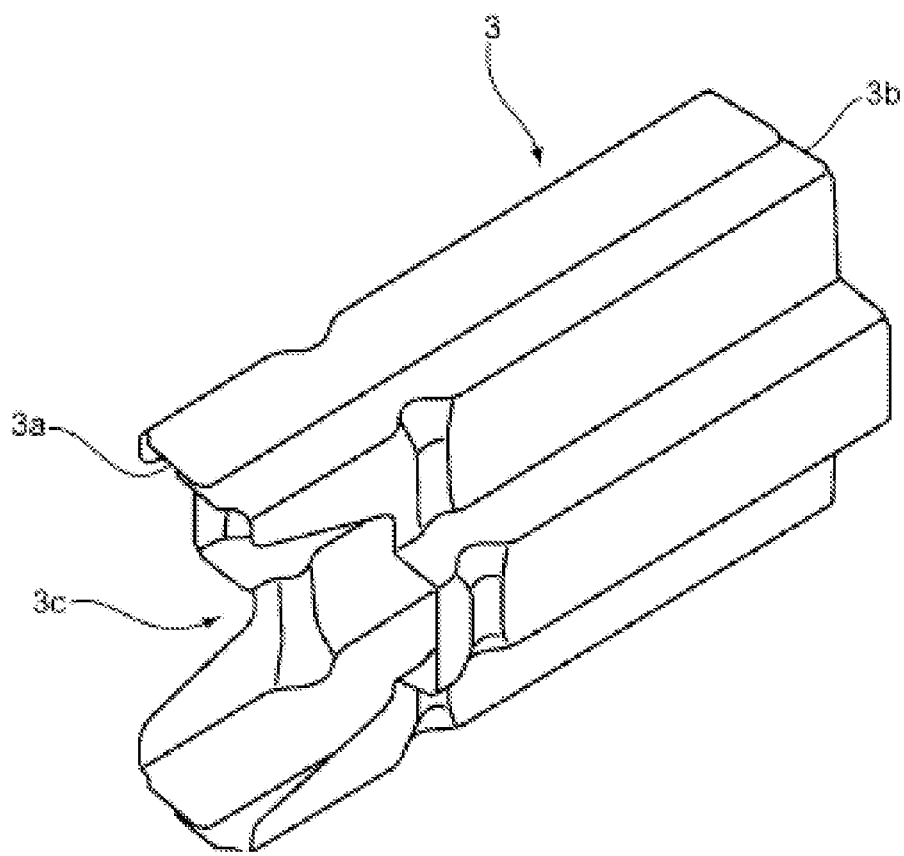
FIG. 13 is an enlarged perspective view of the crash can in FIG. 1.

According to the present disclosure, a shape of the crash can 3 is not particularly limited. For example, as illustrated in FIG. 13, the crash can 3 may be a hollow cylindrical body and have a cross-sectional shape of a cross. Furthermore, a recessed section 3c to which the bumper beam 5 can be fitted may be formed at the front end 3a of the crash can 3.

The bumper 4 includes: the bumper beam 5 that is a body section of the bumper 4; and a front plate 6 that is attached to a portion on the vehicle front side X1 of the bumper beam 5. The bumper beam 5 and the front plate 6 are each manufactured by using a metal plate material such as steel.

The bumper beam 5 extends in the vehicle width direction Y and is fixed to the front ends 3a of the paired crash cans 3 by welding or the like.

Figure 9:
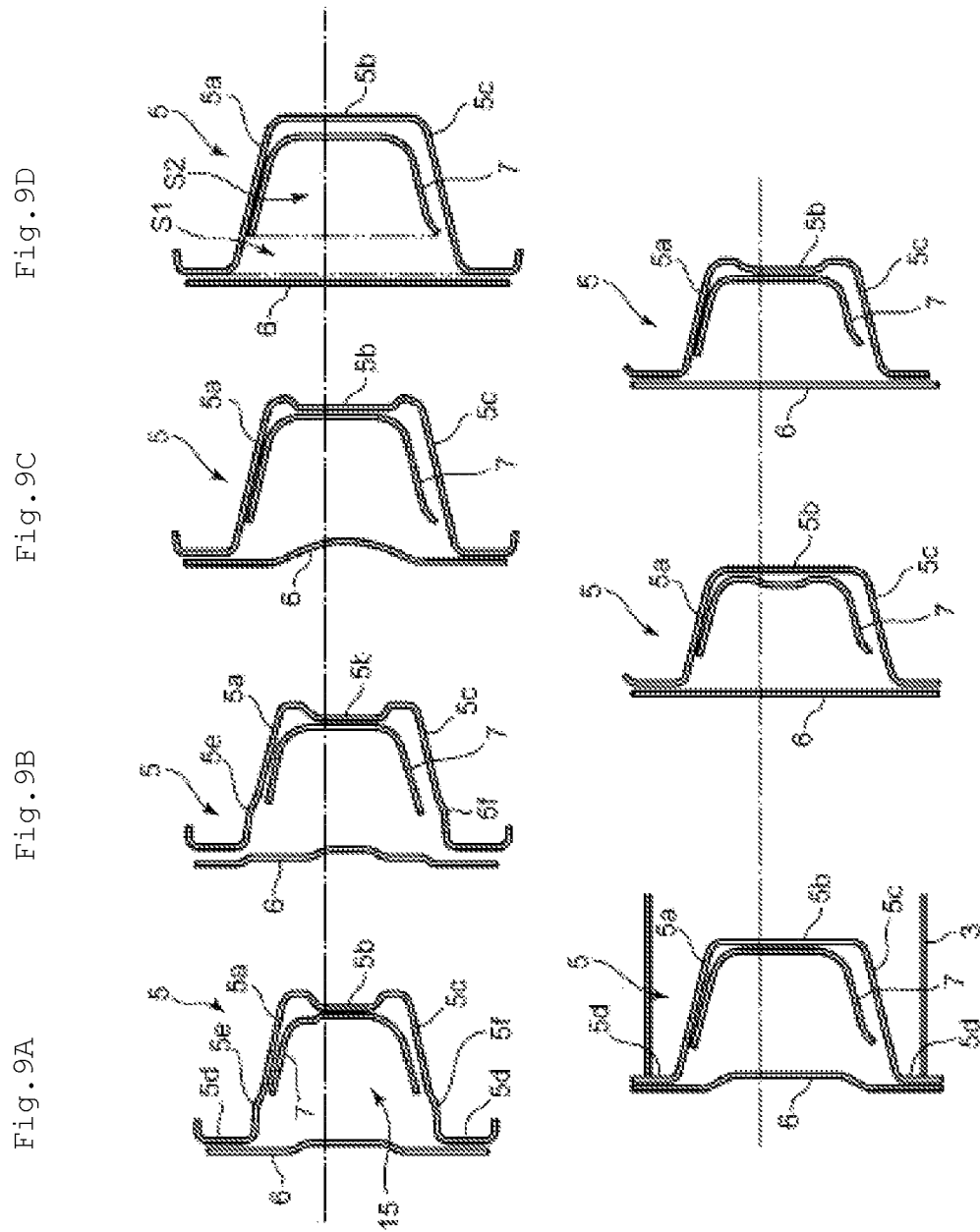
FIGS. 9A to 9G are cross-sectional views at the time when the bumper beam in FIG. 7 is cut at positions A to G.

As illustrated in FIGS. 3 to 7, the bumper beam 5 is a long member that extends in the vehicle width direction Y, and an intermediate region thereof in a vertical direction Z extends to a vehicle rear side X2. In addition, as illustrated in FIGS. 9(*a*) to (*g*), the bumper beam 5 has a substantially mountain-like cross-sectional shape.

Further in detail, as illustrated in FIGS. 9A to 9G, the bumper beam 5 has: an upper surface 5a; a rear surface 5b that extends downward from a rear end of the upper surface 5a; a lower surface 5c that extends forward from a lower end of the rear surface 5b and is located below the upper surface 5a; and a pair of flange sections 5d each of which is projected in the vertical direction Z from a front end of respective one of the upper surface 5a and the lower surface 5c. These upper surface 5a, rear surface 5b, lower surface 5c, and paired flange sections 5d constitute the bumper beam 5 in a hat cross-sectional shape.

Moreover, as illustrated in FIGS. 6 to 7 and FIGS. 9A and 9B, in the bumper beam 5 of this embodiment, at least one (both in this embodiment) of the upper surface 5a and the lower surface 5c is formed with step sections 5e, 5f each bent in the vertical direction Z (in other words, bent in a step shape) and extending in the vehicle width direction Y, between vehicle width direction inner end portions 13 on both sides in the vehicle width direction Y. More specifically, the upper surface 5a is formed with the step section 5e that is bent downward for reinforcement of the upper surface 5a. The lower surface 5c is formed with the step section 5f that is bent upward for reinforcement of the lower surface 5c.

As illustrated in FIG. 2, FIG. 4, FIGS. 6 to 7, and FIG. 10, the bumper beam 5 includes, on each of the sides in the vehicle width direction Y: a crash can fixed section 11 that is fixed to the crash can 3; and an extending section 12 that extends outward in the vehicle width direction Y from the crash can fixed section 11.

In addition, as illustrated in FIG. 3, FIG. 5, FIGS. 9A-9G, and FIGS. 11 to 12, the bumper beam 5 has a reinforcing member 7 therein, and the reinforcing member 7 extends in the vehicle width direction Y and has a U-shaped cross section. The reinforcing member 7 is manufactured by using the metal plate material such as steel and has the U-shaped cross section that is opened in the vehicle front side X1. As illustrated in FIGS. 9A to 9G, the reinforcing member 7 is accommodated in a closed space 15 that is formed by the bumper beam 5 and the front plate 6. The reinforcing member 7 is fixed to the upper surface 5a and the rear surface 5b of the bumper beam 5 by welding or the like. For example, the reinforcing member 7 only needs to be spot-welded to the upper surface 5a and the rear surface 5b of the bumper beam 5 at a plurality of separate positions in the vehicle width direction Y.

Next, a further detailed description will be made on a characteristic for suppressing buckling of the bumper beam 5 according to this embodiment with reference to FIGS. 7 to 8.

Figure 7:
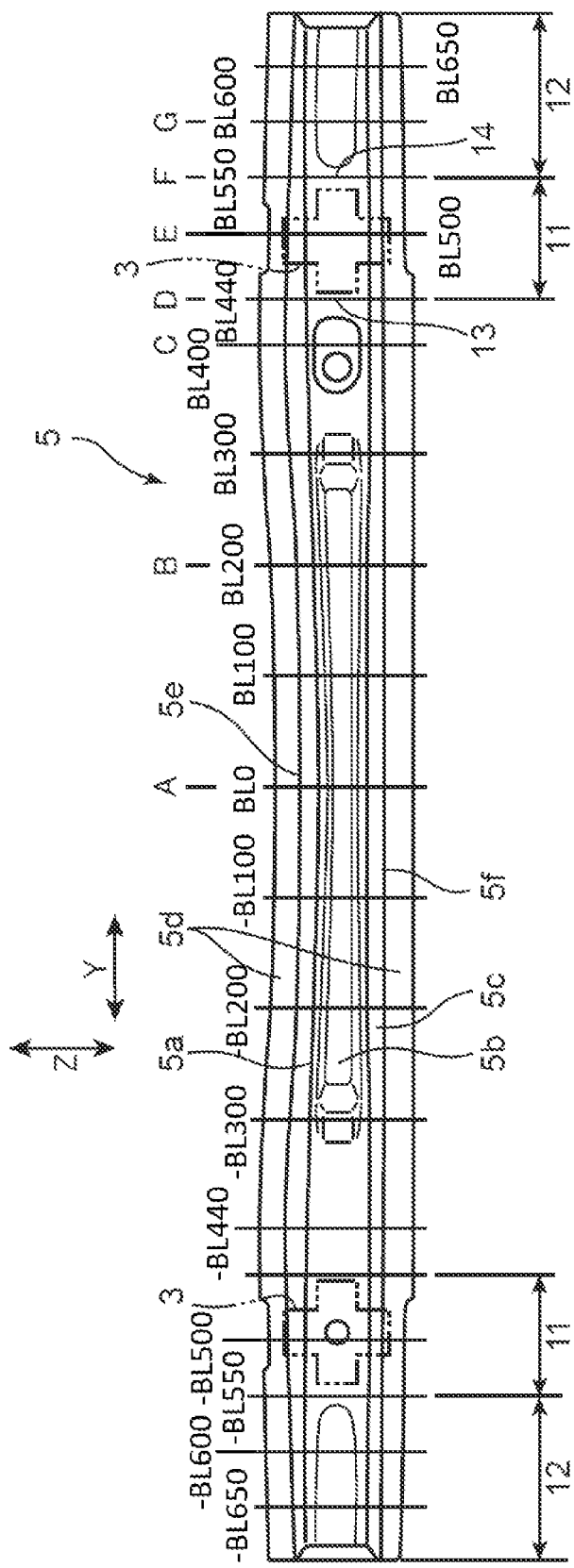
FIG. 7 is a view in which the bumper beam in FIG. 6 is seen from behind.
Figure 8:
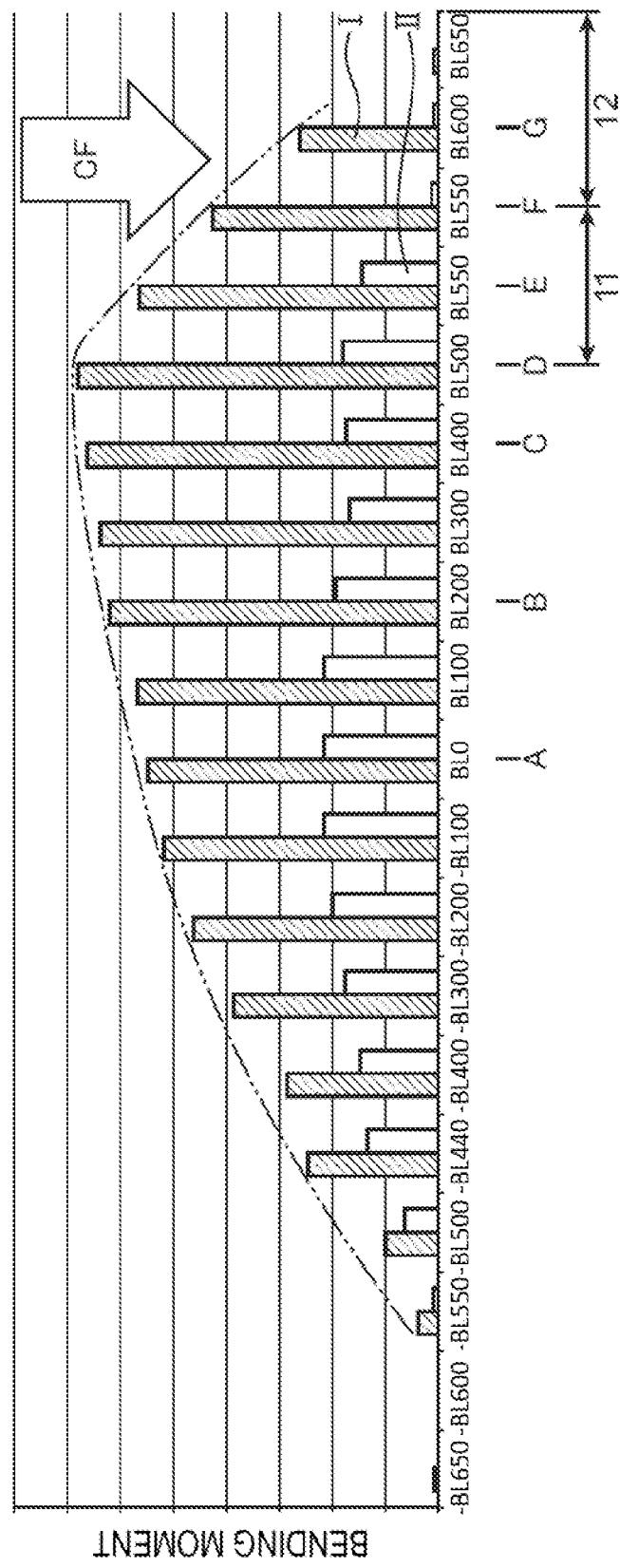
FIG. 8 is a bar graph illustrating distribution of bending moment that is generated at each position in the vehicle width direction of the bumper beam in the case where a collision load of a small overlap collision is applied to an extending section on a right side of the bumper beam in FIG. 7, in which a bar graph I represents distribution of the bending moment that is generated on the bumper beam in this embodiment and a bar graph II represents distribution of the bending moment that is generated on a conventional bumper beam, bending rigidity of which is substantially uniform at each position in the vehicle width direction as a comparative example.

FIG. 8 is a bar graph illustrating distribution of a bending moment that is generated at each position of the bumper beam 5 in the vehicle width direction Y in the case where a collision load CF of a small overlap collision is applied to the extending section 12 on the right side of the bumper beam 5 in FIG. 7. A bar graph I represents the distribution of the bending moment that is generated on the bumper beam 5 in this embodiment, and a bar graph II represents the distribution of the bending moment that is generated on the conventional bumper beam, bending rigidity of which is substantially uniform at each position in the vehicle width direction as a comparative example.

More specifically, the "bending moment" represented by each of the bar graphs I, II illustrated in FIG. 8 is represented by a moment value that is acquired by multiplying a distance of each of the positions from an application point (a position near a position G in FIGS. 7 to 8) of the collision load CF during the small overlap collision by the actual load that is generated at each of the positions, in other words, represents the allowable moment value at each of the positions during the collision.

In this FIG. 8, the bending moment is measured at the plurality of mutually separate positions (19 positions of BL-650 to BL650) in the vehicle width direction Y of the bumper beam 5 in FIG. 7.

The positions A to G illustrated in FIGS. 7 to 8 represent a plurality of positions near the crash can fixed section 11 and the extending section 12 on a right side from an intermediate position (the position A) in the vehicle width direction Y of the bumper beam 5. In particular, the position D is a position of the vehicle width direction inner end portion 13 of the crash can fixed section 11, the position F is a position of a vehicle width direction outer end portion 14 of the crash can fixed section 11, and the position G is a position within a range of the extending section 12 that is located on an outer side of the crash can fixed section 11.

As illustrated in FIGS. 7 to 8, as a structure of preventing buckling of the vehicle width direction inner end portion 13 of the crash can fixed section 11 on the side where the collision load is applied (more specifically, the position D in FIGS. 7 to 8) in the bumper beam 5 at the time when the collision load CF in a direction toward the vehicle rear side X2 is applied to the extending section 12 on one side in the vehicle width direction Y (more specifically, the position near the position G in FIGS. 7 to 8) during the small overlap collision, the bumper beam 5 in this embodiment has such bending rigidity that, as illustrated in the bar graph I in FIG. 8, the bending moment generated on the bumper beam 5 has a mountain-shaped moment characteristic that continues gently with the vehicle width direction inner end portion 13 (the position D in FIGS. 7 to 8) being an apex.

More specifically, the bending rigidity at each of the positions in the vehicle width direction Y of the bumper beam 5 in this embodiment is set such that the bending moment generated on the bumper beam 5 at the time when the collision load in the direction toward the vehicle rear side X2 is the highest in the vehicle width direction inner end portion 13 of the crash can fixed section 11 on the side where the collision load is applied (the position D in FIGS. 7 to 8) is applied to the extending section 12 and that the bending moment is continuously reduced toward the inner side and the outer side in the vehicle width direction Y from the vehicle width direction inner end portion 13 (the position D in FIGS. 7 to 8) (in particular, see a gentle mountain-like shape that is defined by connecting tops of the bar graphs I in a group of the bar graphs I in FIG. 8). In this way, the bumper beam 5 can have such a bending moment characteristic capable of suppressing stress concentration for an entire width of the bumper beam 5 including the vehicle width direction inner end portion 13. As a result, it is possible to suppress buckling of the bumper beam 5.

Meanwhile, the bar graph II in FIG. 8 represents distribution of the bending moment that is generated on the conventional bumper beam, the bending rigidity of which is substantially uniform at each of the positions in the vehicle width direction Y as the comparative example. In the bar graph II, the bending moment is discontinuously and rapidly reduced at the positions F, G near the application point (the position near the position G in FIGS. 7 to 8) during the small overlap collision when compared to that at the nearby position E.

This rapid reduction in the bending moment at the positions F, G in the bar graph II illustrated in FIG. 8 occurs when the bending moment that is high enough to exceed the bending rigidity is locally applied to the vehicle width direction inner end portion 13 of the crash can fixed section 11 (the position D in FIGS. 7 to 8), and buckling thereof thereby occurs.

Thus, when the bar graphs I, II in FIG. 8 are compared for investigation, such a conclusion can be derived that, as illustrated in the bar graph I that represents the bending moment applied to the bumper beam 5 in this embodiment, when the bending rigidity at each of the positions in the vehicle width direction Y of the bumper beam 5 is set such that the bending moment is the highest in the vehicle width direction inner end portion 13 of the crash can fixed section 11 (the position D in FIGS. 7 to 8) and the bending moment is continuously reduced as the distance from the vehicle width direction inner end portion 13 (the position D in FIGS. 7 to 8) in the vehicle width direction Y increases, it is possible to prevent buckling of the vehicle width direction inner end portion 13 in the bumper beam 5.

Here, in order to improve the bending rigidity of the vehicle width direction inner end portion 13 in the bumper beam 5 as described above, the following specific characteristics are provided in this embodiment.

As illustrated in FIG. 9D, of cross-sectional areas at the positions in the vehicle width direction Y in the bumper beam 5, a cross-sectional area S1 of the vehicle width direction inner end portion 13 of the crash can fixed section 11 is the largest. In this way, cross-sectional secondary moment of the vehicle width direction inner end portion 13 is increased, and thus the bending rigidity of the vehicle width direction inner end portion 13 can be improved.

Figure 10:
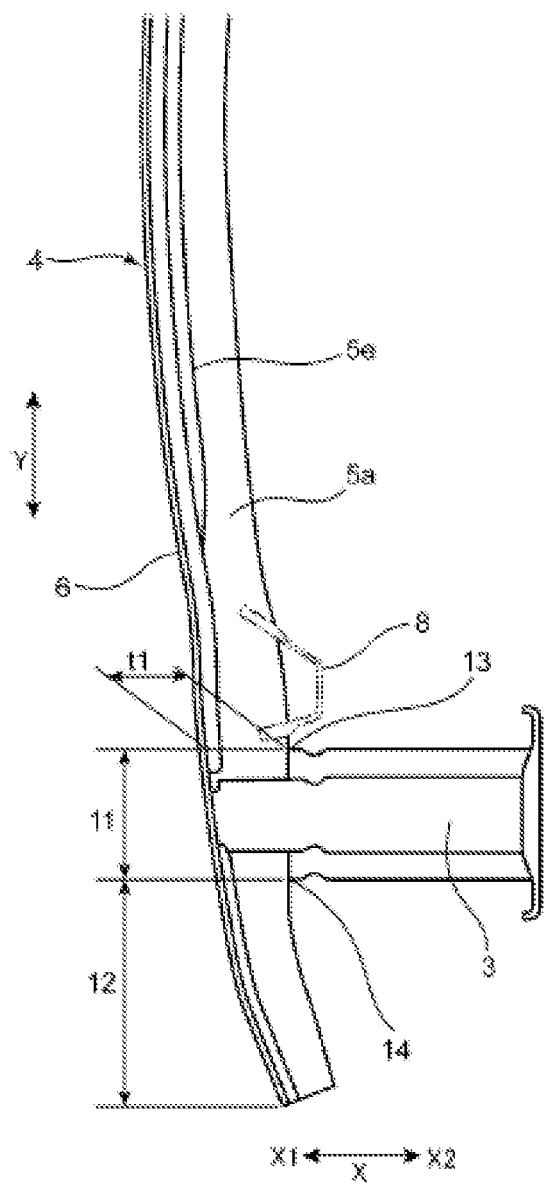
FIG. 10 is an enlarged plan view of an end portion of the bumper beam and a crash can in FIG. 2.
Figure 11:
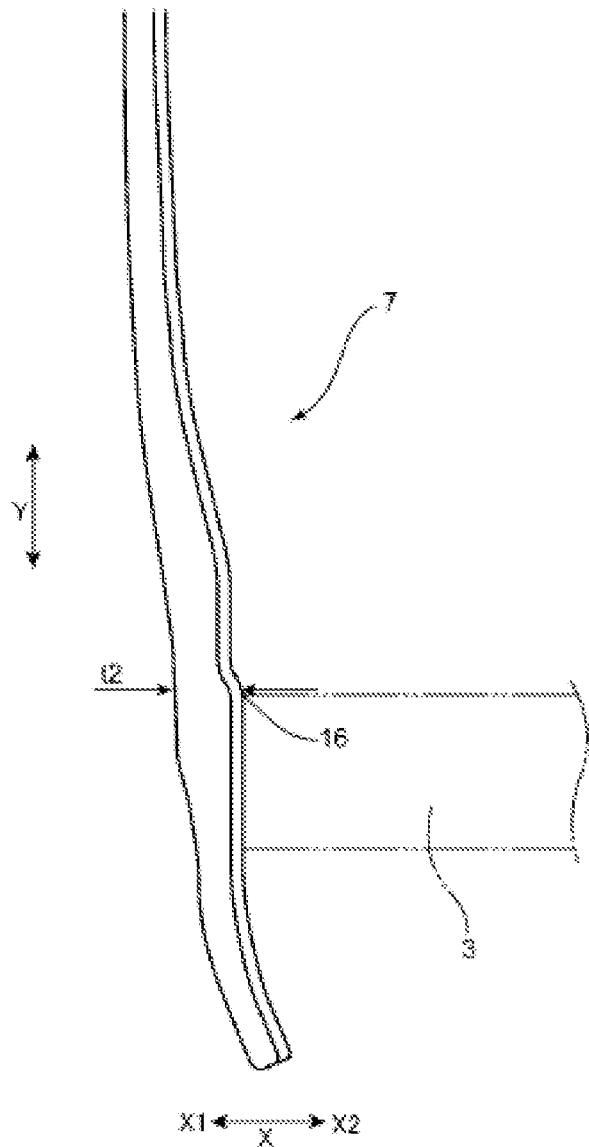
FIG. 11 is an enlarged plan view in which an end portion of a reinforcing member accommodated in the bumper in FIG. 10 is enlarged.
Figure 12:
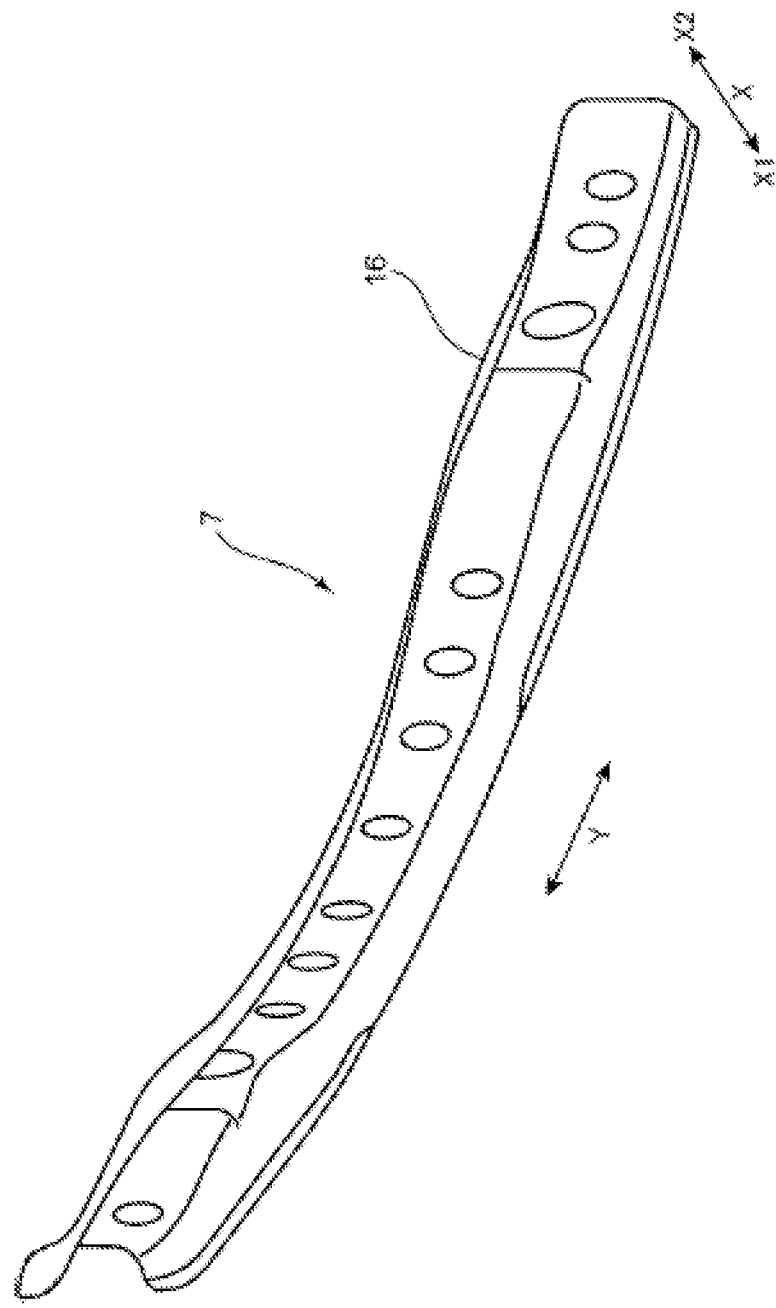
FIG. 12 is a perspective view of the reinforcing member in FIG. 3.

As illustrated in FIG. 10, of widths in the vehicle longitudinal direction X at the positions in the vehicle width direction Y in the bumper beam 5, a width t1 of the vehicle width direction inner end portion 13 of the crash can fixed section 11 is the greatest. Also, in this way, the cross-sectional secondary moment of the vehicle width direction inner end portion 13 is increased, and thus the bending rigidity of the vehicle width direction inner end portion 13 can be improved.

Furthermore, as illustrated in FIG. 7, of heights at the positions in the vehicle width direction Y in the bumper beam 5, a height (that is, a width in the vertical direction Z) of the vehicle width direction inner end portion 13 of the crash can fixed section 11 is the greatest. Also, in this way, the cross-sectional secondary moment of the vehicle width direction inner end portion 13 is increased, and thus the bending rigidity of the vehicle width direction inner end portion 13 can be improved.

Moreover, as illustrated in FIG. 9D, the U-shaped cross section of the reinforcing member 7 is formed such that an area S2 defined by the U-shaped cross section is the largest at the same position (see a position 16 in FIGS. 11 to 12) in the vehicle width direction Y as the vehicle width direction inner end portion 13 of the crash can fixed section 11. In this configuration, a width t2 in the vehicle longitudinal direction X is the maximum at the position 16 of the reinforcing member 7 illustrated in FIG. 11. In this characteristic, cross-sectional secondary moment of the reinforcing member 7 is increased at the position corresponding to the vehicle width direction inner end portion 13, and a reinforcing effect for the vehicle width direction inner end portion 13 by the reinforcing member 7 is increased. Thus, it is possible to improve the bending rigidity of the vehicle width direction inner end portion 13.

The vehicle front body structure 1 according to this embodiment includes: the paired front frames 2 that are arranged away from each other in the vehicle width direction Y and extend in the vehicle longitudinal direction X; the paired crash cans 3 each of which is fixed to the front end 2a of respective one of the paired front frames 2 and extends in the vehicle longitudinal direction X; the bumper beam 5 that is fixed to the front ends 3a of the paired crash cans 3 and extends in the vehicle width direction Y. The bumper beam 5 includes, on each of the sides in the vehicle width direction Y, the crash can fixed section 11 that is fixed to the crash can 3; and the extending section 12 that extends outward in the vehicle width direction Y from the crash can fixed section 11.

The bending rigidity at each of the positions in the vehicle width direction Y of the bumper beam 5 is set such that the bending moment generated on the bumper beam 5 at the time when the collision load in the direction toward the vehicle rear side X2 is applied to the extending section 12 is the highest in the vehicle width direction inner end portion 13 of the crash can fixed section 11 on the side where the collision load is applied (see the position D of the bar graph I in FIG. 8) and that the bending moment is continuously reduced toward the inner side and the outer side in the vehicle width direction Y from the vehicle width direction inner end portion 13.

The distance from the collision load application point is longer to the vehicle width direction inner end portion 13 of the crash can fixed section 11 in the bumper beam 5 than to the outer end portion in the vehicle width direction Y. Thus, the vehicle width direction inner end portion 13 of the crash can fixed section 11 in the bumper beam 5 is most likely to buckle when the collision load in the direction toward the vehicle rear side X2 is applied to the extending section 12 (that is, at the time of the small overlap collision). Accordingly, since the bending rigidity at each of the positions in the vehicle width direction Y of the bumper beam 5 is set as described above, the bending moment generated on the bumper beam 5 is the highest in the vehicle width direction inner end portion 13 of the crash can fixed section 11 on the side where the collision load is applied (that is, the bending rigidity of the bumper beam 5 is the highest), and the bending moment is continuously reduced as the distance from the vehicle width direction inner end portion 13 in the vehicle width direction Y increases (that is, the bending rigidity of the bumper beam 5 is continuously reduced). In this way, the bumper beam 5 can have such a bending moment characteristic capable of suppressing stress concentration for an entire width of the bumper beam 5 including the vehicle width direction inner end portion 13. As a result, it is possible to prevent buckling of the bumper beam 5.

In the above configuration, during a small overlap collision, a difference in the rigidity between the adjacent positions in the vehicle width direction Y of the bumper beam 5 is reduced while buckling of the vehicle width direction inner end portion 13 of the crash can fixed section 11 in the bumper beam 5 is prevented. In this way, it is possible to reduce the stress concentration in the bumper beam 5 so as to prevent buckling of the bumper beam 5, and it is possible to reliably transfer the collision load, which is applied to the bumper beam 5, to the crash cans 3 and the front frames 2.

As illustrated in FIG. 9D, in the vehicle front body structure 1 according to this embodiment, of the cross-sectional areas at the positions in the vehicle width direction Y in the bumper beam 5, the cross-sectional area S1 of the vehicle width direction inner end portion 13 of the crash can fixed section 11 is the largest.

With such a configuration, since the cross-sectional area S1 of the vehicle width direction inner end portion 13 of the crash can fixed section 11 is the largest, it is possible to improve the bending rigidity of the vehicle width direction inner end portion 13, and it is thus possible to prevent buckling of the bumper beam 5. In addition, in this configuration, the bending rigidity can partially be improved simply by increasing the cross-sectional area S1 of the vehicle width direction inner end portion 13, and it is possible to lower manufacturing costs.

In the vehicle front body structure 1 according to this embodiment, as illustrated in FIG. 10, of the widths in the vehicle longitudinal direction X at the positions in the vehicle width direction Y in the bumper beam 5, the width t1 of the vehicle width direction inner end portion 13 of the crash can fixed section 11 is the greatest.

With such a configuration, since the width t1 in the vehicle longitudinal direction X of the vehicle width direction inner end portion 13 of the crash can fixed section 11 is the greatest, it is possible to improve the bending rigidity of the vehicle width direction inner end portion 13, and it is thus possible to prevent buckling of the bumper beam 5. In addition, in this configuration, it is possible to partially and reliably improve the bending rigidity against the collision load from the vehicle front side X1 simply by increasing the width t1 in the vehicle longitudinal direction X of the vehicle width direction inner end portion 13, and it is possible to lower the manufacturing cost.

In the vehicle front body structure 1 according to this embodiment, as illustrated in FIG. 7, of the heights (that is, the widths in the vertical direction Z) at the positions in the vehicle width direction Y in the bumper beam 5, the height of the vehicle width direction inner end portion 13 of the crash can fixed section 11 is the greatest.

With such a configuration, the height of the vehicle width direction inner end portion 13 of the crash can fixed section 11 is the greatest, it is possible to improve the bending rigidity of the vehicle width direction inner end portion 13, and it is thus possible to prevent buckling of the bumper beam 5. In addition, in this configuration, the bending rigidity can partially be improved simply by increasing the height of the vehicle width direction inner end portion 13, and it is possible to lower the manufacturing cost.

In the vehicle front body structure 1 according to this embodiment, as illustrated in FIG. 3, FIG. 5, FIGS. 9A-9G, and FIGS. 11 to 12, the bumper beam 5 has the reinforcing member 7 therein, and the reinforcing member 7 extends in the vehicle width direction Y and has the U-shaped cross section. The U-shaped cross section is formed such that the area S2 (see FIG. 9D) defined by the U-shaped cross section is the largest at the same position (see the position 16 in FIGS. 11 to 12) in the vehicle width direction Y as the vehicle width direction inner end portion 13 of the crash can fixed section 11.

With such a configuration, in the configuration that the bumper beam 5 has the reinforcing member 7 therein, the area S2 defined by the U-shaped cross section of the reinforcing member 7 is the largest at the same position in the vehicle width direction Y as the vehicle width direction inner end portion 13 of the crash can fixed section 11. In this way, the reinforcing effect for the vehicle width direction inner end portion 13 of the bumper beam 5 by the reinforcing member 7 becomes the highest. Thus, it is possible to improve the bending rigidity of the vehicle width direction inner end portion 13 the most. As a result, it is possible to further prevent buckling of the bumper beam 5.

In the vehicle front body structure 1 according to this embodiment, as illustrated in FIGS. 9A and 9B, the bumper beam 5 has the upper surface 5a and the lower surface 5c each of which extends in the vehicle width direction Y. At least one (both in this embodiment) of the upper surface 5a and the lower surface 5c is formed with the step sections 5e, 5f each bent in the vertical direction Z (in other words, bent in the step shape) and extending in the vehicle width direction Y, between the vehicle width direction inner end portions 13 on both of the sides in the vehicle width direction Y.

With such a configuration, at least one of the upper surface 5a and the lower surface 5c of the bumper beam 5 is formed with the step sections 5e, 5f each bent in the vertical direction Z and extending in the vehicle width direction Y, between the vehicle width direction inner end portions 13 on both of the sides in the vehicle width direction Y. By these step sections 5e, 5f, it is possible to reinforce the bending rigidity of the bumper beam 5 continuously in the vehicle width direction Y and thus to reduce the difference in the rigidity between the adjacent positions in the vehicle width direction Y of the bumper beam 5. As a result, it is possible to further reduce the stress concentration in the bumper beam 5 so as to further prevent buckling of the bumper beam 5.

Here, the step sections 5e, 5f can be provided to only one of the upper surface 5a and the lower surface 5c. However, a configuration that the step sections 5e, 5f are provided to both of the upper surface 5a and the lower surface 5c is preferred since the effect of reinforcing the bending rigidity of the bumper beam 5 continuously in the vehicle width direction Y is increased.

What is claimed is:

1. A vehicle front body structure comprising:
   a pair of front frames that are arranged away from each other in a vehicle width direction and extend in a vehicle longitudinal direction;
   a pair of crash cans each of which is fixed to a front end of respective one of the paired front frames and extends in the vehicle longitudinal direction; and
   a bumper beam that is fixed to the front ends of the paired crash cans and extends in the vehicle width direction; wherein
   the bumper beam includes, on each side in the vehicle width direction, a crash can fixed section that is fixed to the crash can; and an extending section that extends outward in the vehicle width direction from the crash can fixed section,
   bending rigidity in the vehicle width direction of the bumper beam is such that a bending moment generated on the bumper beam when a collision load in a direction toward a vehicle rear side is applied to the extending section is the highest in a vehicle width direction inner end portion of the crash can fixed section on a side where the collision load is applied, and the bending moment is continuously reduced as a distance from the vehicle width direction inner end portion in the vehicle width direction increases,
   a cross-sectional area of the bumper beam at the vehicle width direction inner end portion of the crash can fixed section is the largest cross-sectional area of the bumper beam in the vehicle width direction, and
   a width of the bumper beam in the vehicle longitudinal direction of the vehicle width direction inner end portion of the crash can fixed section is the greatest width in the vehicle longitudinal direction of the bumper beam in the vehicle width direction.

2. The vehicle front body structure according to claim 1, wherein a height of the vehicle width direction inner end portion of the crash can fixed section is the greatest height of the bumper beam in the vehicle width direction.

3. The vehicle front body structure according to claim 2, wherein
   the bumper beam has a reinforcing member, the reinforcing member extending in the vehicle width direction and having a U-shaped cross section, and
   an area defined by the U-shaped cross section is the largest at a position in the vehicle width direction of the vehicle width direction inner end portion of the crash can fixed section.

4. The vehicle front body structure according to claim 3, wherein
   the bumper beam has an upper surface and a lower surface each of which extends in the vehicle width direction, and
   at least one of the upper surface and the lower surface is formed with a step section bent in a vertical direction and extending in the vehicle width direction between the vehicle width direction inner end portions on both of the sides in the vehicle width direction.

5. The vehicle front body structure according to claim 1, wherein
   the bumper beam has a reinforcing member, the reinforcing member extending in the vehicle width direction and having a U-shaped cross section, and
   an area defined by the U-shaped cross section is the largest at a position in the vehicle width direction of the vehicle width direction inner end portion of the crash can fixed section.

6. The vehicle front body structure according to claim 1, wherein
   the bumper beam has an upper surface and a lower surface each of which extends in the vehicle width direction, and
   at least one of the upper surface and the lower surface is formed with a step section bent in a vertical direction and extending in the vehicle width direction between the vehicle width direction inner end portions on both of the sides in the vehicle width direction.

7. The vehicle front body structure according to claim 5, wherein
   the bumper beam has an upper surface and a lower surface each of which extends in the vehicle width direction, and
   at least one of the upper surface and the lower surface is formed with a step section bent in a vertical direction and extending in the vehicle width direction between the vehicle width direction inner end portions on both of the sides in the vehicle width direction.

* * * * *